United States Patent [19]

Mayama et al.

[11] 4,366,418

[45] Dec. 28, 1982

[54] SPECTRAL SOURCE, PARTICULARLY FOR ATOMIC ABSORPTION SPECTROMETRY

[75] Inventors: Shinji Mayama; Yoji Arai, both of Katsuta, Japan

[73] Assignee: Hitachi, Ltd., Tokyo, Japan

[21] Appl. No.: 175,745

[22] Filed: Aug. 6, 1980

[30] Foreign Application Priority Data

Aug. 17, 1979 [JP] Japan ................................ 54-104755

[51] Int. Cl.[3] ........................... H01J 11/04; G01J 3/30

[52] U.S. Cl. ..................................... 315/326; 313/209; 315/246; 356/314

[58] Field of Search ................ 356/311, 314; 250/425, 250/426; 313/209, 210, 161, 346 R; 315/326, 267, 246, 344

[56] References Cited

U.S. PATENT DOCUMENTS

| | | | |
|---|---|---|---|
| 3,475,099 | 10/1969 | Yasuda et al. | 313/209 |
| 4,100,446 | 7/1978 | Harada et al. | 313/209 |
| 4,198,589 | 4/1980 | Mayama et al. | 356/314 |

*Primary Examiner*—Harold A. Dixon

*Attorney, Agent, or Firm*—Antonelli, Terry & Wands

[57] ABSTRACT

A spectral source comprises a lamp containing an anode and a cathode in an inert gas. The cathode has a hollow portion therein, and a opening at its side wall. The anode is positioned to face the opening of the cathode. The anode and cathode are different in shape and connected to a high-frequency discharge power source. A magnetic field is arranged in perpendicular to the direction of the axial center of the opening.

15 Claims, 6 Drawing Figures

SPECTRAL SOURCE, PARTICULARLY FOR ATOMIC ABSORPTION SPECTROMETRY

BACKGROUND OF THE INVENTION

This invention relates to a spectral source, and more particularly to a spectral source for a polarized Zeeman atomic absorption spectrophotometer of the type of high frequency discharge which comprises a lamp having an anode and a cathode, and means for applying a magnetic field to the space formed between the anode and the cathode.

As a polarized Zeeman atomic absorption spectrophotometer excels in background correction, it is widely used for microanalysis of metal. Such a spectrophotometer is divided into two groups of types depending upon where the magnetic field is formed. The one is the type in which the magnetic field is formed in an atomizer for atomizing the sample to be analyzed. The other is the type in which the magnetic field is formed at the lamp of the spectral source. The former is inconvenient to fit a burner of the atomizer which is disposed between a pair of magnets because the space between the magnets is small, and also has a defect that the magnets become large in size so that the magnets are required to be disposed so as to surround the burner. The latter has a defect that, when a hollow cathode lamp of a spectral source including a hollow cathode and an anode is connected to D.C. power source, the life time of the lamp becomes short and the radiation intensity of the lamp considerably decreases. To improve the latter defect, it has been proposed to use a high-frequency source connected between the hollow cathode and the anode for establishing stabilized discharge therebetween.

A spectral source of this type is disclosed in U.S. Pat. No. 4,198,589. Essential disadvantage of this prior art resides in the fact that the life time of the lamp cannot be prolonged so long, as a result the lamp has some troubles in maintenance thereof.

SUMMARY OF THE INVENTION

One object of this invention is to provide a spectral source having a long life time.

Other object of this invention is to provide a spectral source which emits radiation of high intensity.

Another object of this invention is to provide a spectral source in which the dimensions of the lamp can be reduced.

Still another object of this invention is to provide a spectral source which can achieve a sufficient cathode sputtering so as to create a strong excitation radiation thereof.

A further object of this inventon is to provide a spectral source which is convenient for the maintenance thereof.

According to this invention, a first electrode has a hollow portion, and an opening is formed at the side wall of the first electrode.

The opening of the first electrode is positioned to face a second electrode. The first and second electrodes are disposed within a bulb which contains an inert gas therein. The first and second electrodes are connected to a high-frequency source. A magnetic field is formed in perpendicular to the direction of the opening.

In this invention, the direction of the opening of the first electrode for discharging high-frequency current, the direction of the magnetic field, and the direction of the axis of the light beam, or the direction of the radiated beam, are arranged to be right angles to one another. Accordingly, the radiated beam of the spectrophotometer of this invention can be pushed against the bottom of the hollow portion. As the side wall of the hollow portion of the first electrode is not exhausted as shown in the prior art, the spectral source of this invention can achieve the object of this invention.

DESCRIPTION OF THE PRIOR ART

The disadvantage of the prior art as exemplified by U.S. Pat. No. 4,198,589 is explained by referring to FIGS. 1 and 2.

Figure 1:
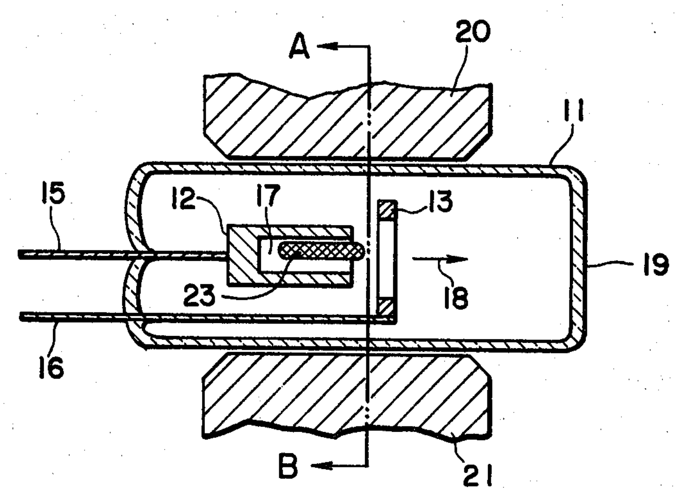
FIG. 1 PRIOR ART
FIG. 1 is a cross sectional view of a conventional lamp of an atomic absorption spectrophotometer of the type of high-frequency discharge.

FIG. 1 shows a cross sectional view of the lamp of an atomic absorption spectrophotometer.

Figure 2:
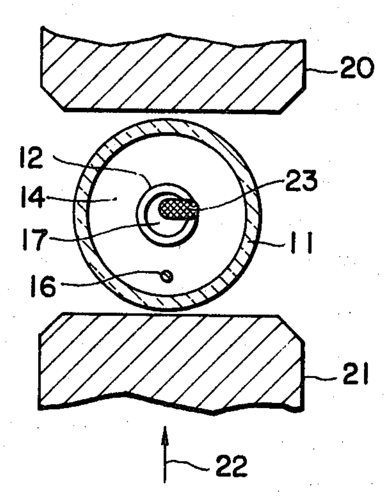
FIG. 2 PRIOR ART
FIG. 2 is a cross sectional view taken along line A-B in FIG. 1.

FIG. 2 shows a cross sectional view taken along line A-B in FIG. 1. A first electrode 12 supported by a lead wire 15 and a second electrode 13 supported by a lead wire 16 are disposed within a bulb 11 formed of hard glass. A first electrode 12 has a hollow portion 17 and contains an element emitting a desired spectrum. A high frequency source (not shown) is connected between the first electrode 12 and the second electrode 13 to cause the sputtering of the element contained in the first electrode 12. An inert gas is contained in the bulb 11 to maintain a discharge.

A pair of magnets 20 and 21 are disposed to face each other across the bulb 11. Thus a magnetic field is developed in the direction as shown by an arrow 22 in FIG. 2. When a high frequency power is applied between the first electrode 12 and the second electrode 13, ions of the inert gas within the bulb 11 are accelerated. Ions of the inert gas collide with the first electrode 12 to cause sputtering the first electrode 12 and produce atomized substances within the hollow portion 17 of the first electrode 12. The atomized substances cause excitation of a radiation having a desired spectrum by application of the high frequency power.

To provide the Zeeman effect on spectral light 18, a strong magnetic spectral light 18, a strong magnetic field is desired to be formed extending perpendicular to the spectral light 18. As a result, a force is produced which operates on a radiated beam 23 of the spectral light 18 to turn the radiated beam 23 toward the inner wall of the first electrode 12 as shown in FIG. 2.

When the sputtering is continued for a long time in such a direction as shown in FIGS. 1 and 2, the first electrode 12 is exhausted at the portion where the inclined radiated beam 23 collides with the inner wall surface of the first electrode 12. Accordingly the place where the inclined radiated beam 23 collides therewith moves gradually inward toward the hollow portion 17 of the first electrode 12.

To remove this defect, it is necessary frequently to rotate the bulb 11 along the axial direction of the bulb 11 to prevent the damage stated above. This is troublesome in maintaining the spectrophotometer, and also means that a precise measurement of the spectrophotometer cannot be expected. This will result in the defect that an abnormal discharge tends to be developed between two electrodes 12 and 13, and shorten a life time of the lamp.

DETAILED DESCRIPTION OF THE PREFERRED EMBODIMENTS

Figure 3:
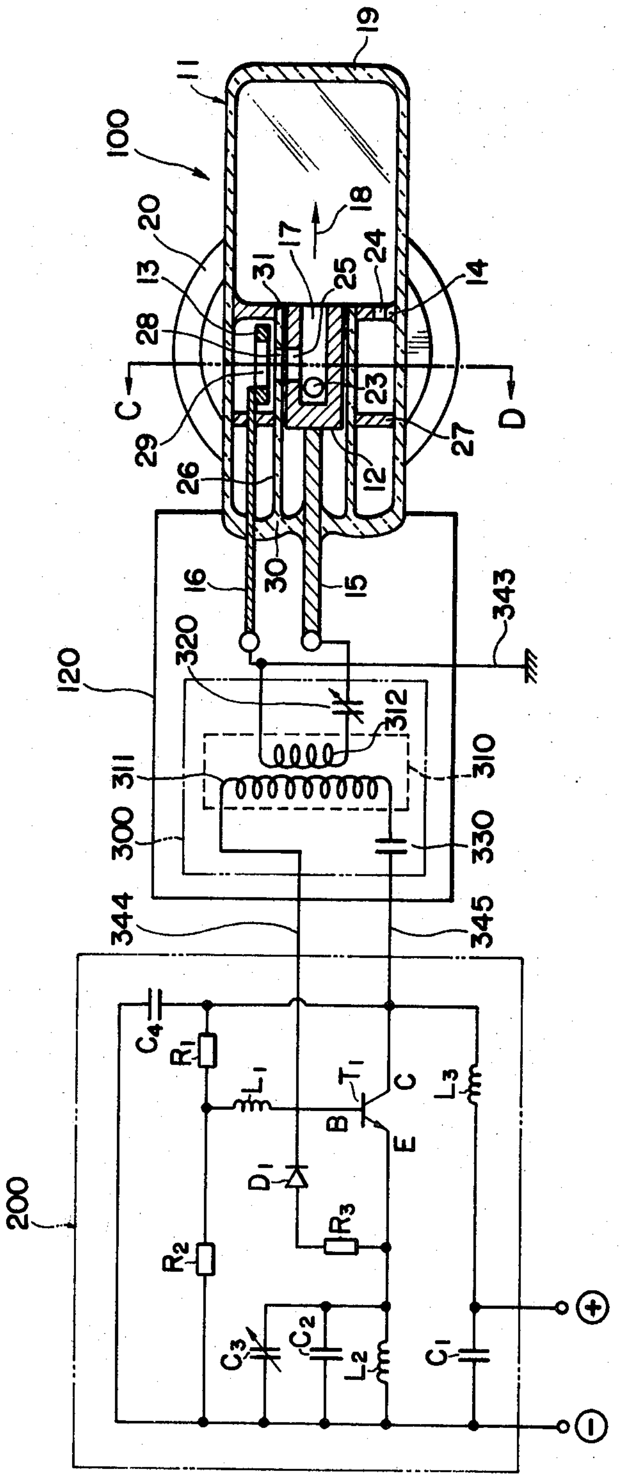
FIG. 3 is a schematic, partly sectional, overall view of a spectral source according to a preferred embodiment of this invention.

According to the embodiment of this invention shown in FIG. 3, the spectral source includes three portions, namely a lamp 100 for emitting a light radiation with the spectrum of certain desired metal elements, a high-frequency power section 200 for applying high-frequency power to the lamp 100, and an impedance adapter 300 for adapting the impedance of the high-frequency power section 200 to that of the lamp 100. The three portions are electrically interconnected.

The lamp 100 includes a light emitting portion within which the cathode sputtering and the excitation of the radiation take place, and a socket 120 for introducing the high-frequency power. The light emitting portion 11 includes a first electrode 12 containing the desired metal element and a second electrode 13 having a shape different from that of the first electrode 12, and a bulb 11 formed of hard glass within which the first and second electrodes 12, 13 and an inert gas such as argon, helium, neon and the like at a vacuum of about 1 to 15 Torr are contained. The mass of the first electrode 12 is larger than that of the second electrode 13. The first electrode 12 supported by a lead wire 15 may be preferably formed as a hollow electrode for obtaining the so-called hollow effect. An opening 25 is formed at the side wall of the first electrode 12 to transfer the inert gas therethrough. The second electrode 13 supported by a lead wire 16 is positioned to face the opening 25. The second electrode 13 is preferably in the form of a disc having a central hole 29, and made from nonmagnetic material such as stainless steel. The second electrode 13 is arranged concentrically with the axial center of the opening 25. The lead wires 15 and 16 are made from iron-nickel alloy. A pair of magnets 20, 21 is formed in perpendicular to the direction of the opening 25. A cylindrical member 26 formed of an insulating material, such as glass or steatite, is arranged between the first electrode 12 and the second electrode 13. The cylindrical member 26 surrounds the first electrode 12, and is arranged concentrically with the axial center of the first electrode 12. The cylindrical member 26 has an opening 28 opposite to the opening 25. The openings 25 and 28 are positioned concentrically with the axial center thereof. One open end 30 of the cylindrical member 26 is maintained in contact with one end inner wall surface of the bulb 11. A disc plate 14 with an opening 24 for ventilating inert gas is disposed between the other end 31 of the cylindrical member 26 and the inner wall surface of the bulb 11. An insulating disc plate 27 is disposed between the central outer wall portion of the longitudinal direction of the cylindrical member 26 and the inner wall surface of the bulb 11. The other end of the bulb 11 provides a window 19 for transmitting the radiation of the spectral light 18. Additionally, the bulb 11 is provided with a reduced diameter at the location where the first electrode 12 and the second electrode 13 are disposed.

The impedance adapter 300 includes a transformer 310 having a primary coil 311 and a secondary coil 312, a variable capacitor 320, and a capacitor 330. One side of the secondary coil 312 is connected by the variable capacitor 320 and a terminal 15 to the first electrode 12 of the lamp 11, while the other side of the secondary coil 312 is connected by a terminal 16 to the second electrode 13. One side of the primary coil 311 is connected by a line 344 to the high-frequency power section 200, and the other side of the primary coil 311 is connected by the capacitor 330 and a line 345 also to the power section 200. The second electrode 13 may be grounded by a line 343. By reducing the dimension of the impedance adapter 300, the same may be housed in the socket or base 120 of the lamp 11.

The high-frequency power section 200 comprises an electric circuit which may include capacitors C1 to C4, resistors R1 to R3, reactances L1 to L3, a transistor T1, and a diode D1, interconnected as shown in FIG. 3.

The operation of the light source described above is as follows. The high-frequency power produced by the power section 200 is supplied through the impedance adapter 300 to the lamp 100. In the impedance adapter 300, the high-frequency power is transformed by the transformer 310, by which the impedance is changed, transmitted via the variable capacitor 320 which compensates for inductances of the transformer 310 and the lamp 100, and applied between the first and second electrodes 12, 13.

In the light emitting portion 11, the high-frequency power creates a high-frequency discharge between the first and second electrodes to ionize the inert gas contained in the bulb 11.

When a high-frequency power, of 2 to 20 W and having a frequency of 20 MHz to 300 MHz, is applied between the first electrode 12 and the second electrode 13, negative potential is induced at the first electrode 12 and ions of the inert gas within the bulb 11 is accelerated, because the high-frequency power is rectified due to the difference in shape between the first and second electrodes 12, 13. Ions of the inert gas collide with the first electrode 12 to cause sputtering the first electrode 12 and produce atomized substances within the hollow portion 17 of the first electrode 12. The atomized substances cause excitation of a radiation having a desired spectrum. The radiation having the spectrum of the first electrode 12 is transmitted through the window 19 of the light emitting portion 11. Grounding the second electrode 13 intensifies the emitted radiation. The magnetic field is created in the direction 22 as shown by an arrow 22 in FIG. 4. The direction of the current flow between the second electrode 13 and the first electrode 12 is perpendicular to the direction 22 of the magnetic field, because the second electrode 13 and the first electrode 12 operate as an anode electrode and a cathode electrode, respectively.

Therefore, a force is produced which operates on the radiated beam 23 to push against the bottom of the hollow portion 17 of the first electrode 12 as taught by Fleming's left-hand rule. Then the radiated beam 23 is fixed at the bottom of the hollow portion 17 of the first electrode 12, and the sputtering of the first electrode 12 takes place therein. Next, the axis of light beam 18 being maintained stationary, the spectral source of this invention prolongs its lamp life time.

Figure 4:
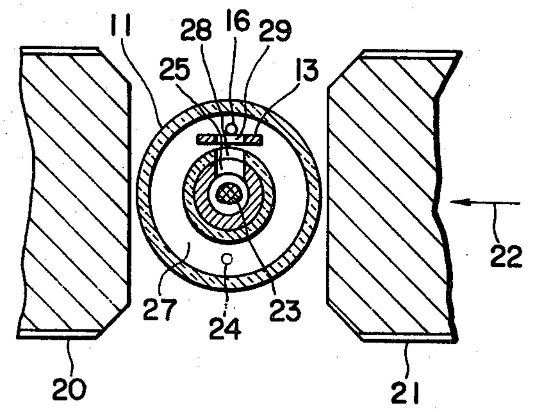
FIG. 4 is a cross sectional view taken along line C-D in FIG. 3.

According to the preferred embodiment of this invention shown in FIGS. 3 and 4, the lamp life time becomes about 10 times that of the prior art shown in FIGS. 1 and 2, or Japanese Laying-open of patent application No. 53-91797 (1978), in the same specification on the spectral source except the characteristic points of this invention. And the result of light intensity of this invention shown in FIGS. 3 and 4 is improved by approximately 10% as compared to that of the prior art. The specification of the spectral source shown in FIGS. 3 and 4 is as follows. The high-frequency source is of 7 W, 100 MHz. The strength of the magnetic field is 5 K Gauss. The bulb 11 has a diameter of about 25 mm and an axial length of about 120 mm. The hollow portion 17 has an inner diameter of about 3 mm and a depth of about 10 mm. The opening 25 has an inner diameter of about 3 mm. The second electrode 13 has an inner diameter of about 10 mm and a thickness of about 1 mm. As the pair of magnets 20 and 21 face each other across the bulb 11, the spectral source of this invention is made comparatively small.

By forming the cylindrical member 26 surrounding the first electrode 12, the atomized substances caused by the sputtering of the first electrode 12 is prevented from fixing at the outer portion surrounding the opening 25 of the first electrode 12. Then the fluctuation of the light axis of the beam 18 and the light strength do not occur. By forming the disc plate 14, it shuts off a discharge which generates between the lead wire 16 and the hollow portion 17 of the first electrode 12.

Figure 5:
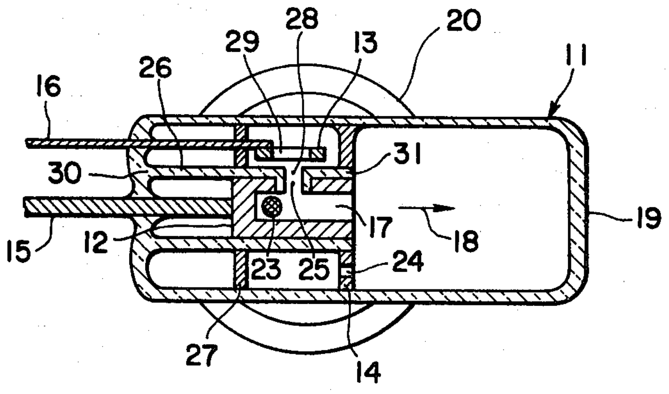
FIGS. 5 and 6 are cross sectional views of lamps of atomic absorption spectrophotometer according to other preferred embodiments of this invention.

Referring to FIG. 5, the cylindrical member 26 covers the outer surface of the first electrode 12 and the inner wall surface of the opening 25. By forming as above, the opening 25 is prevented from the distortion thereof which will occur by the current flow from the second electrode 13 to the first electrode 12.

Figure 6:
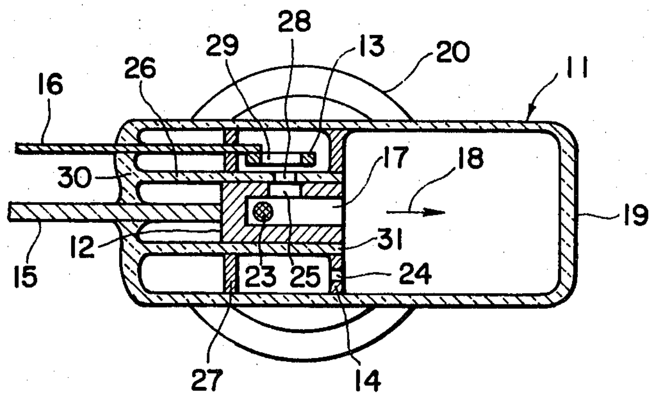

Referring to FIG. 6, the cylindrical member 26 has a smaller opening than that of the first electrode 12, and it covers the first electrode 12. The openings 25 and 28 are arranged concentrically with the axial center thereof. By forming the cylindrical member as shown in FIG. 6, the atomized substances caused by the sputtering of the first electrode 12 tend to recycle within the hollow portion 17, because it is difficult for the atomized substances to escape through the small opening 28 of the cylindrical member 26 shown in FIG. 6.

Then the spectral source shown in FIG. 6 can constantly maintain the high intensity thereof.

According to this invention, the spectral source particularly for atomic absorption spectrometry can achieve the object of this invention, mainly in prolonging its lamp life time, by arranging the direction of the opening 25 for discharging high-frequency current, the direction of the magnetic field 22, and the direction of the axis 18 of the light beam at right angles to one another.

We claim:

1. A spectral source comprising a lamp having a bulb and a base,

- a first electrode disposed within said bulb, said first electrode having a bottom and a side wall extending from said bottom in an axial direction so as to form a hollow portion in said first electrode, said first electrode being provided with a first opening at its side wall for conducting electric current therethrough, said first opening extending through said side wall in a direction away from the axial direction, and said first electrode containing an element emitting a desired spectrum,
- a second electrode disposed within said bulb to face said first opening, and arranged concentrically with the axial center of said first opening,
- a high-frequency source connected between said first and second electrodes for establishing a high-frequency discharge therebetween to cause sputtering of said first electrode and excitation of a radiation having said desired spectrum,
- a gas contained in said bulb for maintaining said discharge,
- means for supplying a magnetic field to an atomic vapor produced by said sputtering, said means being formed in perpendicular to the direction of said first opening, and
- a window provided in said bulb and arranged in the axial direction for transmitting said radiation therethrough.

2. The spectral source of claim 1, wherein said means for supplying a magnetic field to an atomic vapor produced by said sputtering enables formation of a radiation beam having said desired spectrum, a direction of said electric current being conducted through said first opening, a direction of said magnetic field, and a direction of a force operating on said radiation beam being arranged at right angles to one another, the direction of the force operating on the beam being in a direction toward said bottom of said first electrode.

3. The spectral source of claim 1, wherein said second electrode is grounded.

4. The spectral source of claim 2, wherein the axial direction of said side wall of said first electrode and the direction of the force operating on said radiation beam are parallel to one another.

5. The spectral source of claim 1 or claim 2, said source further comprising,

- a cylindrical member formed of an insulating material, said cylindrical member being arranged between said first electrode and said second electrode surrounding said first electrode and being arranged concentrically with the axial center of said first electrode, one open end of said cylindrical member being maintained in contact with inner wall surface of said bulb, and said cylindrical member having a second opening to face said first opening and being arranged concentrically with the axial center of said first opening, and
- a plate formed of an insulating material being disposed between the other end of said cylindrical member and inner wall surface of said bulb, whereby high-frequency electric current beam of said source is conducted between said first electrode and said second electrode through said second opening.

6. The spectral source of claim 5, wherein said cylindrical member covers outer surface of said first electrode and inner wall surface of said first opening.

7. The spectral source of claim 5, wherein diameter of said second opening is smaller than that of said first opening, and said cylindrical member covers outer surface of said first electrode.

8. The spectral source of claim 5, wherein said plate has a third opening for ventilating said gas.

9. The spectral source of claim 1 or claim 2, wherein said first electrode forms a hollow cathode and said second electrode forms a cylindrical anode.

10. The spectral source of claim 1 or claim 2, comprising means for adapting the impedance of said lamp to that of said high-frequency source.

11. The spectral source of claim 10, wherein said impedance adapting means is contained within said lamp base.

12. The spectral source of claim 1 or claim 2, wherein said bulb has a reduced diameter at the location where said first and second electrodes are disposed.

13. The spectral source of claim 1 or claim 2, wherein said high-frequency source has a frequency between about 3 MHz and about 300 MHz and a power between about 2 W and about 20 W.

14. The spectral source of claim 1 or claim 2, wherein the second electrode is provided with a shape different than the shape of said first electrode.

15. The spectral source of claim 1 or claim 2, wherein the second electrode has a smaller surface area than that of said first electrode.

* * * * *